United States Patent
Ross et al.

(10) Patent No.: US 10,076,828 B2
(45) Date of Patent: Sep. 18, 2018

(54) SEALANT LINER APPLICATOR WITH VACUUM CHUCK

(71) Applicants: Allan Ross, Englewood, CO (US); Frank Buck, Englewood, CO (US)

(72) Inventors: Allan Ross, Englewood, CO (US); Frank Buck, Englewood, CO (US)

(73) Assignee: Custom Machining Corp., Englewood, CO (US)

( * ) Notice: Subject to any disclaimer, the term of this patent is extended or adjusted under 35 U.S.C. 154(b) by 0 days.

(21) Appl. No.: 15/409,363

(22) Filed: Jan. 18, 2017

(65) Prior Publication Data
US 2018/0200868 A1    Jul. 19, 2018

(51) Int. Cl.
| | | |
|---|---|---|
| *B23B 31/30* | (2006.01) | |
| *B25B 11/00* | (2006.01) | |
| *B05C 5/02* | (2006.01) | |
| *B23Q 3/08* | (2006.01) | |

(52) U.S. Cl.
CPC .......... *B25B 11/005* (2013.01); *B05C 5/0204* (2013.01); *B23B 31/307* (2013.01); *B23Q 3/088* (2013.01); *Y10T 279/11* (2015.01)

(58) Field of Classification Search
CPC .. B23B 31/307; B23Q 3/088; B23Q 2703/04; B25B 11/005; Y10T 279/11
See application file for complete search history.

(56) References Cited

U.S. PATENT DOCUMENTS

| | | | | |
|---|---|---|---|---|
| 2,524,545 A | * | 10/1950 | Shanklin | B21D 51/46 118/313 |
| 3,389,682 A | * | 6/1968 | Gardner | B25B 11/005 118/52 |
| 3,426,727 A | * | 2/1969 | Balain | G03F 7/162 118/500 |
| 3,898,954 A | * | 8/1975 | Galitz | B21D 51/46 118/315 |
| 4,262,629 A | | 4/1981 | McConnellogue | |
| 4,840,138 A | | 6/1989 | Stirbis | |
| 5,215,587 A | | 6/1993 | McConnellogue | |
| 5,564,877 A | | 10/1996 | Hamilton | |
| 5,706,843 A | * | 1/1998 | Matsuo | B05C 11/08 108/22 |
| 6,113,333 A | | 9/2000 | Rutledge | |
| 6,730,168 B1 | | 5/2004 | Ross | |

* cited by examiner

*Primary Examiner* — Eric A Gates
*Assistant Examiner* — Chwen-Wei Su
(74) *Attorney, Agent, or Firm* — Edwin H. Crabtree; Ramon L. Pizarro

(57) ABSTRACT

A vacuum chuck adapted for mounting on a lower turret assembly. The lower turret assembly is part a sealant liner applicator. The sealant liner applicator includes an upper turret assembly and a sealant gun, under computer control. The sealant gun is used for applying a sealant around a periphery of an inside of a can or jar lid. The vacuum chuck includes in one embodiment an impeller, with spiral vanes, for creating vacuum air. The impeller is mounted on top of a lower chuck. A top portion of the impeller is adapted for receiving the can lid and held thereon using the vacuum air produced when the impeller and the lower chuck are spun at high speeds, in a range of 1000 to 4000 rpm, on a lower turret assembly.

7 Claims, 7 Drawing Sheets

SEALANT LINER APPLICATOR WITH VACUUM CHUCK

BACKGROUND OF THE INVENTION

(a) Field of the Invention

This invention relates to a sealant liner applicator used for applying a sealant inside a metal jar or can lid and more particularly, but not by way of limitation, to a sealant liner applicator having a vacuum chuck used for holding the lid in place, when using a sealant gun for applying the sealant thereon.

(b) Discussion of Prior Art

Heretofore, there have been a variety of different types of sealant liner applicators using an upper and lower chuck for rotating metal lids or metal ends and applying a sealant thereon. These types of applicators require a large initial capital investment. Also, the equipment is complex and expensive to maintain. Further, the changing of different lid sizes is complicated.

In U.S. Pat. No. 3,898,954 to Galitz, a complex compound applying machine is described. The machine includes two different oscillating members for alternate feeding of articles receiving a compound. In U.S. Pat. No. 5,564,877 to Hamilton, a turret liner machine is disclosed. The turret liner is used for applying a sealing compound to the end of cans. This type of applicator includes a spray mist system next to sealant injector nozzles. In U.S. Pat. Nos. 4,262,629 and 5,215,587 to McConnellogue et al., two different sealant applicators for can lids are described. The applicators are used in conjunction with a rotary chuck table. In U.S. Pat. No. 4,840,138 to Stirbis, a sealant supply system is illustrated having a plurality of rotatable sealant applying heads. In U.S. Pat. Nos. 6,113,333 and, 6,547,878 to Rutledge et. al., rotating lift chuck with a plurality of sealant applying guns is disclosed.

None of the above mentioned prior art patents specifically disclose the unique features, structure and function of the subject sealant liner applicator having a vacuum chuck as discussed herein.

SUMMARY OF THE INVENTION

In view of the foregoing, it is a primary objective of the subject invention to provide a vacuum chuck used with a sealant liner applicator for applying sealant to metal can and jar lids at speeds in a range of 100 to 3000 lids per minute.

Also, a life of the vacuum chuck can last up to one year or more, when holding different size lids and compared to prior art mechanical chucks, which require replacement or maintenance anywhere from one week to six months, when in use.

Still anther object of the invention is the vacuum chuck can be changed out on a standard turret assembly for runs of different diameters of can and jar lids. The different diameters of lids can be in a range of 2 to 7 inches and greater.

The vacuum chuck is adapted for mounting on a lower turret assembly. The lower turret assembly is part a sealant liner applicator. The sealant liner applicator includes an upper turret assembly and a sealant gun, under computer control. The sealant gun is used for applying a sealant around a periphery of an inside of a can or jar lid. The vacuum chuck includes in one embodiment an impeller, with spiral vanes, for creating a vacuum. The impeller is mounted on top of a lower chuck. A top portion of the impeller is adapted for receiving the can lid and held thereon using the vacuum produced when the impeller and the lower chuck are spun at high speeds, in a range of 1000 to 4000 rpm, on a lower turret assembly.

These and other objects of the present invention will become apparent to those familiar with various types of sealant liner applicators used for applying sealant to metal can and jar lids when reviewing the following detailed description, showing novel construction, combination, and elements as herein described, and more particularly defined by the claims, it being understood that changes in the various embodiments of invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figure 1:
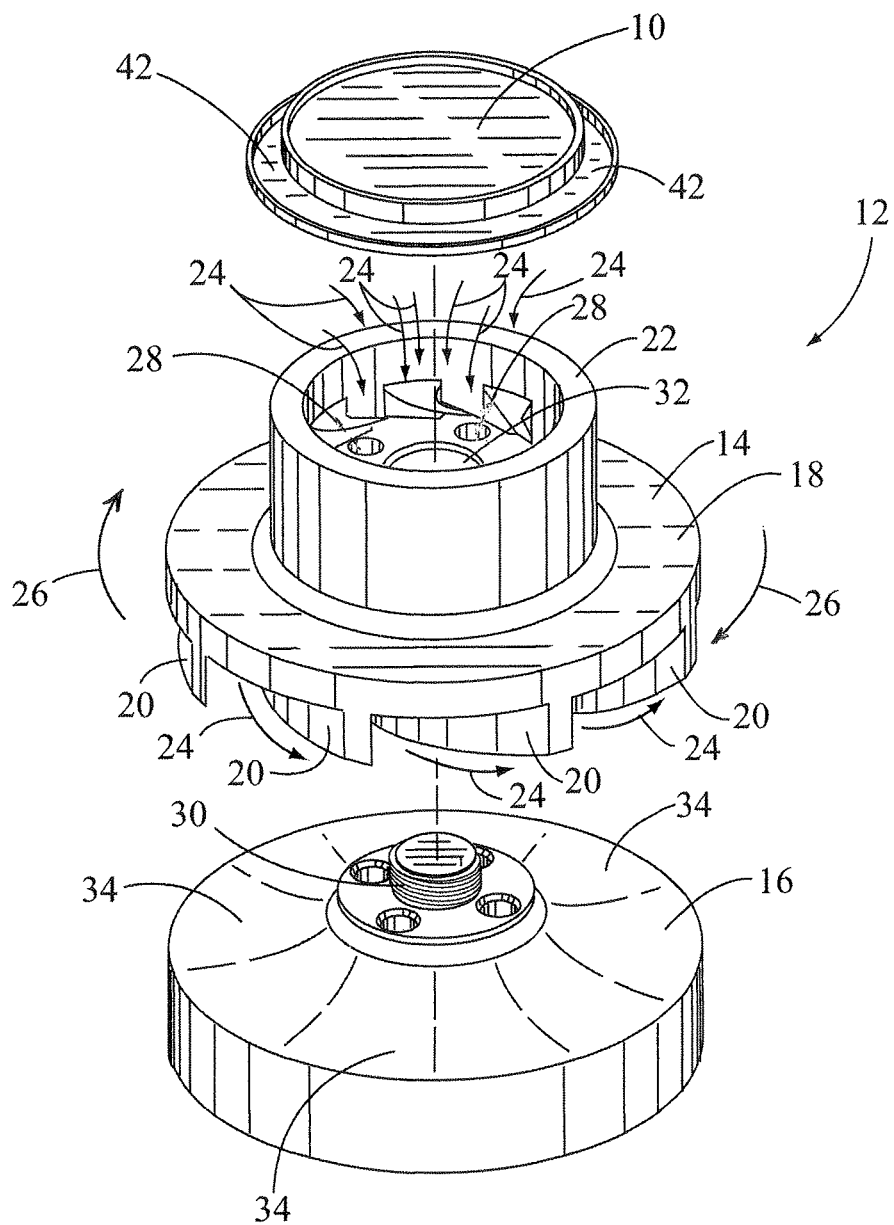
FIG. 1 is an exploded perspective view of a can or jar lid disposed above a vacuum chuck with a lower chuck impeller and a lower chuck.

In FIG. 1, a perspective view of a can or jar lid 10 is shown disposed above an annular-shaped, vacuum-chuck, having a general reference numeral 12. In this example, the vacuum chuck 12 is used for holding smaller can lids having diameters in a range of 2 to 3 inches. The vacuum chuck 12 includes a lower chuck impeller 14 and a lower chuck.

The lower chuck impeller 14 includes a vane base plate 18 with spiral vanes 20, used for creating a vacuum. Mounted on top of the vane base plate 18 is an open top can lid cylinder 22 for receiving the can lid 10 thereon. By spinning the vacuum chuck 12 using the spiral vanes 20 at high speeds, in a range of 1000 to 4000 rpm, a vacuum or vacuum air is created, shown as arrows 24. The spinning of the vacuum chuck 12 is shown as arrows 26. The vacuum air 24 is drawn through vacuum ports 28 in the vane base plate 18 and inside the bottom of the can lid cylinder 22 for holding the can lid 10 thereon.

The lower chuck impeller 14 is shown disposed above the lower chuck 16 for attachment thereto using a threaded post 30. The post 30 is threaded around a threaded base plate hole 32 centered on the vane base plate 18. The lower chuck 16 includes a concave top portion 34 for engaging the bottom of the spiral vanes 20 and creating a secure fit and improved vacuum air suction, when creating the vacuum air 24 using the vacuum chuck 12.

Figure 2:
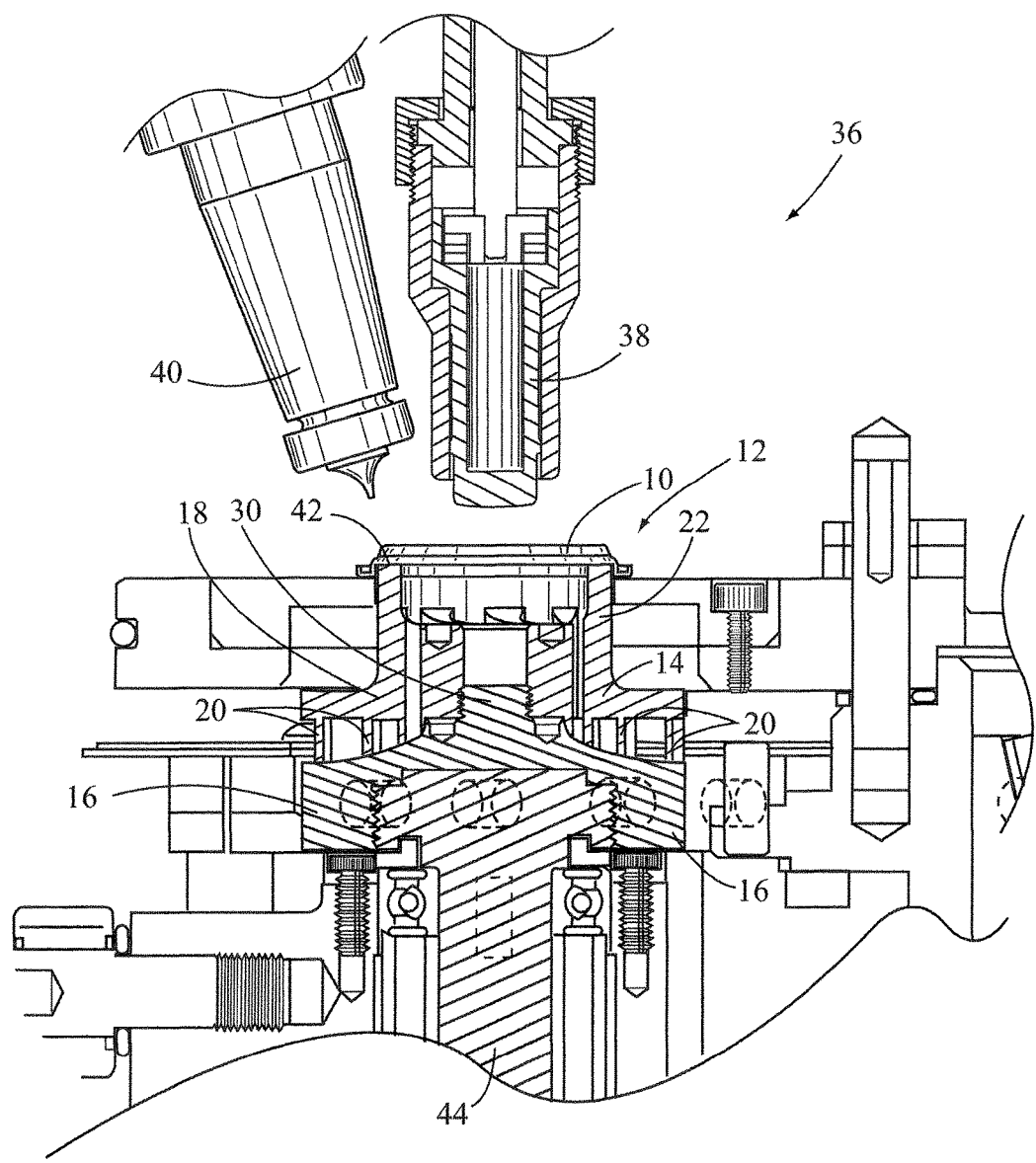
FIG. 2 is a front view of a sealant liner applicator, having an upper turret assembly disposed next a sealant gun and a lower turret assembly.

In FIG. 2, a front view of a sealant liner applicator is shown having general reference numeral 36. The sealant liner applicator 36 includes an upper turret assembly 38, shown in cross section and disposed next a sealant gun 40. The sealant gun 40 is under computer control and used for applying a sealant around a periphery 42 around the inside of the can lid 10. The sealant liner application 36 also includes a lower turret assembly 44, shown in cross section.

In this drawing, the vacuum chuck 12 is illustrated in a "down position" and mounted on the lower turret assembly 44, by threading the top of the assembly 44 to the bottom of the lower chuck 16. The can lid 10 is shown received on top of the lower chuck impeller 14 and held thereon using the vacuum 24 created by the spinning of the vacuum chuck 12 on the lower turret assembly 44.

Figure 3:
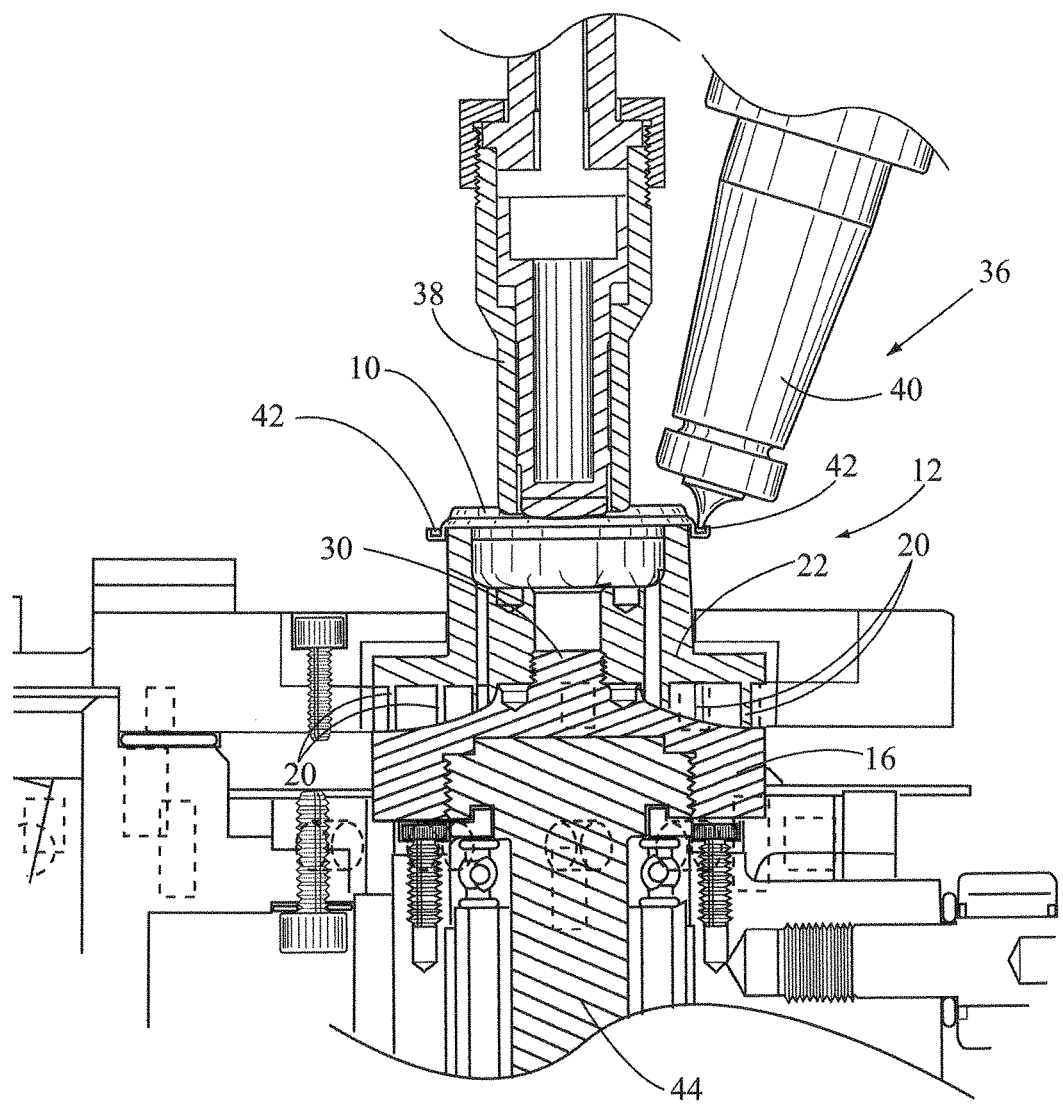
FIG. 3 is another front view of the sealant liner application, with the vacuum chuck in an "up position" with the sealant gun ready to apply a sealant around the periphery of the inside of the can lid.

In FIG. 3, another front view of the sealant liner application 36 is illustrated. In this drawing, the vacuum chuck 12 is shown in an "up position" with can lid 10 held against a bottom of the upper turret assembly 38. At this time, the sealant gun 40 is ready to apply a sealant around the periphery 42 of the inside of the can lid 10.

Figure 4:
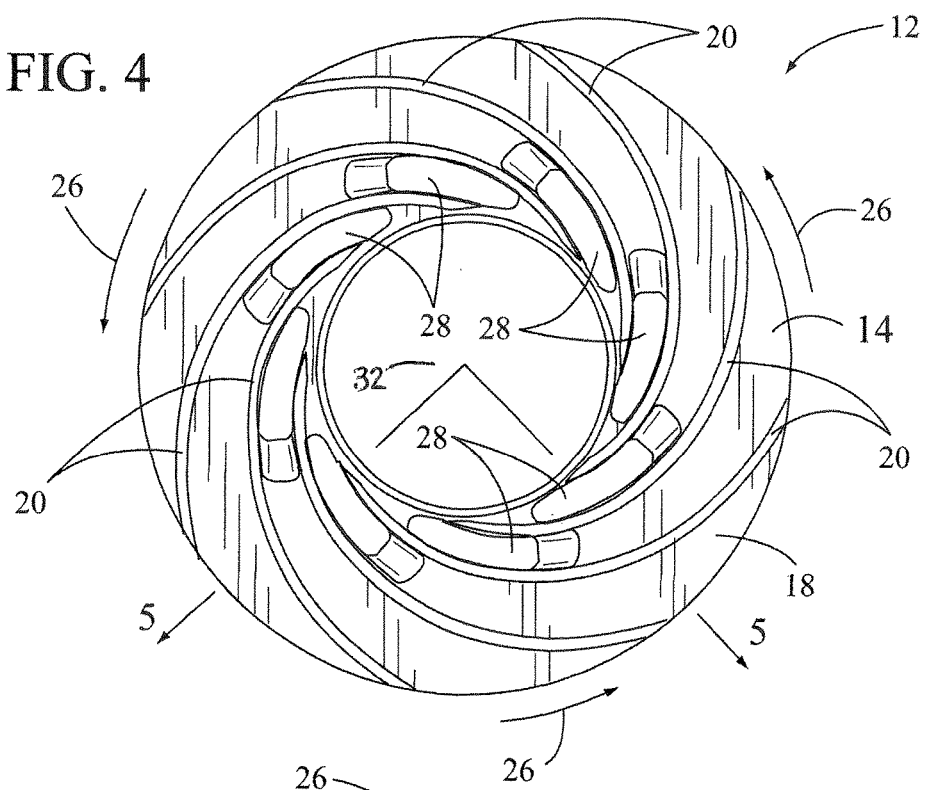
FIG. 4 is a bottom view of another embodiment of the lower chuck impeller, used of holding larger can and jar lids having a diameter in a range of 4 to 7 inches.

In FIG. 4, an embodiment of the vacuum chuck 12 is illustrated and used for creating a vacuum and holding can lids 10, having a diameter of 4 to 7 inches and greater. In this drawing, a bottom, or upside down, perspective view of the lower chuck impeller 14 is shown. In this drawing, the spiral vanes 20 are shown extending outwardly from the base plate hole 32 in the center of the lower chuck impeller 14. When the impeller 14 is turned over, the vane base plate 18, with the vacuum ports 28, is adapted for receiving large diameter can lids 10.

Figure 5:
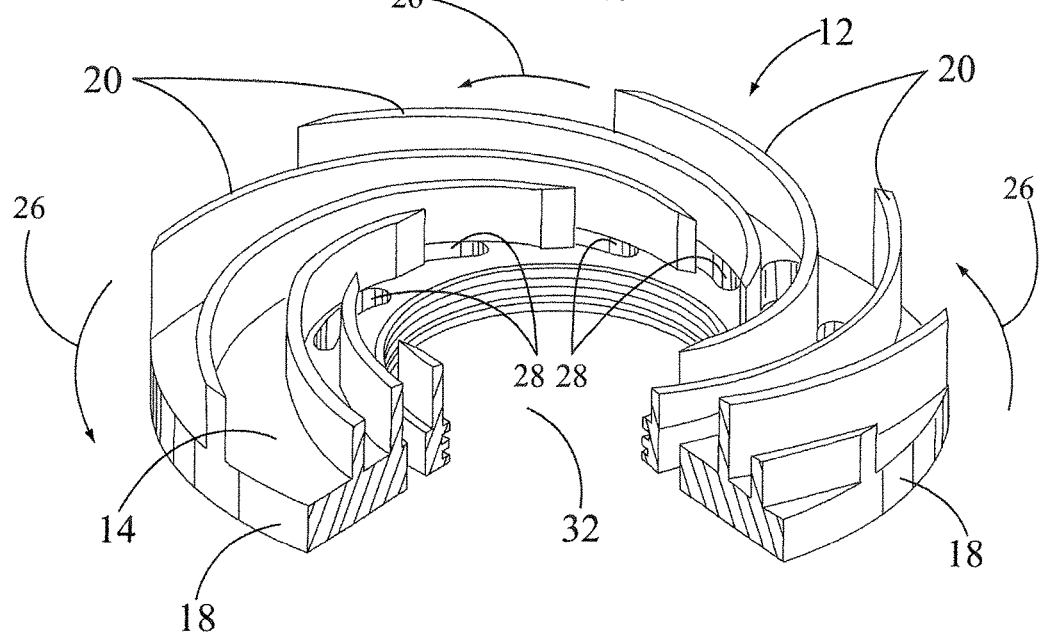
FIG. 5 is a perspective view of the impeller shown in FIG. 4 with a portion of the impeller cutaway along lines 5-5

In FIG. 5, a perspective view of the vacuum chuck impeller 14 is illustrated. In this drawing, a portion of the impeller 14 is cutaway along lines 5-5, shown in FIG. 4. The vacuum ports 28 of the impeller 14 are illustrated next the threaded side of the base plate hole 32.

Figure 6:
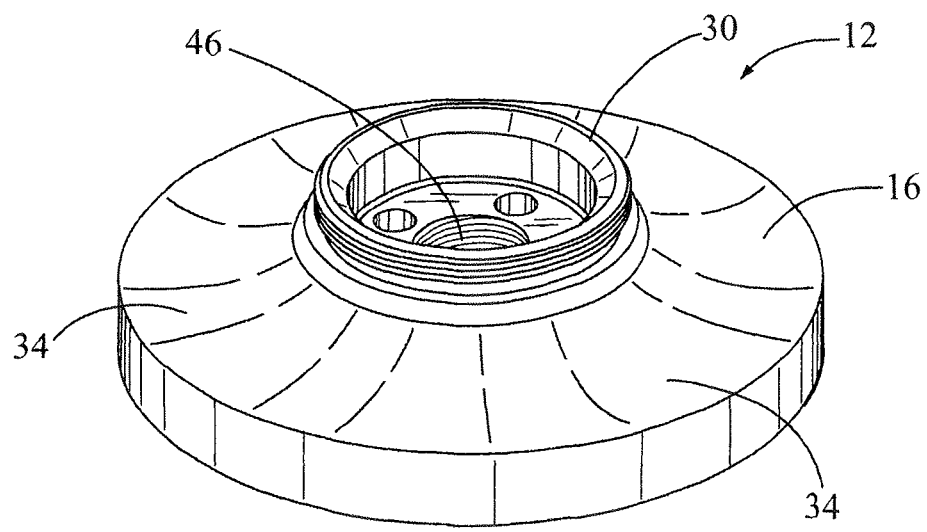
FIG. 6 is a perspective view of the lower chuck and with an upward extending threaded post, used for the securing the lower chuck to the lower chuck impeller.

In FIG. 6, a perspective view of the lower chuck 16 is illustrated with the concave top portion 34 and the upward extending threaded post 30. The post 30 is used for the securing the lower chuck 16 to the bottom of the lower chuck impeller 14, shown in FIGS. 4 and 5. Also shown in this drawing is a threaded lower turret assembly hole 46 used for securing the vacuum chuck 12 on top of the lower turret assembly 44, shown in FIGS. 3 and 4.

Figure 7:
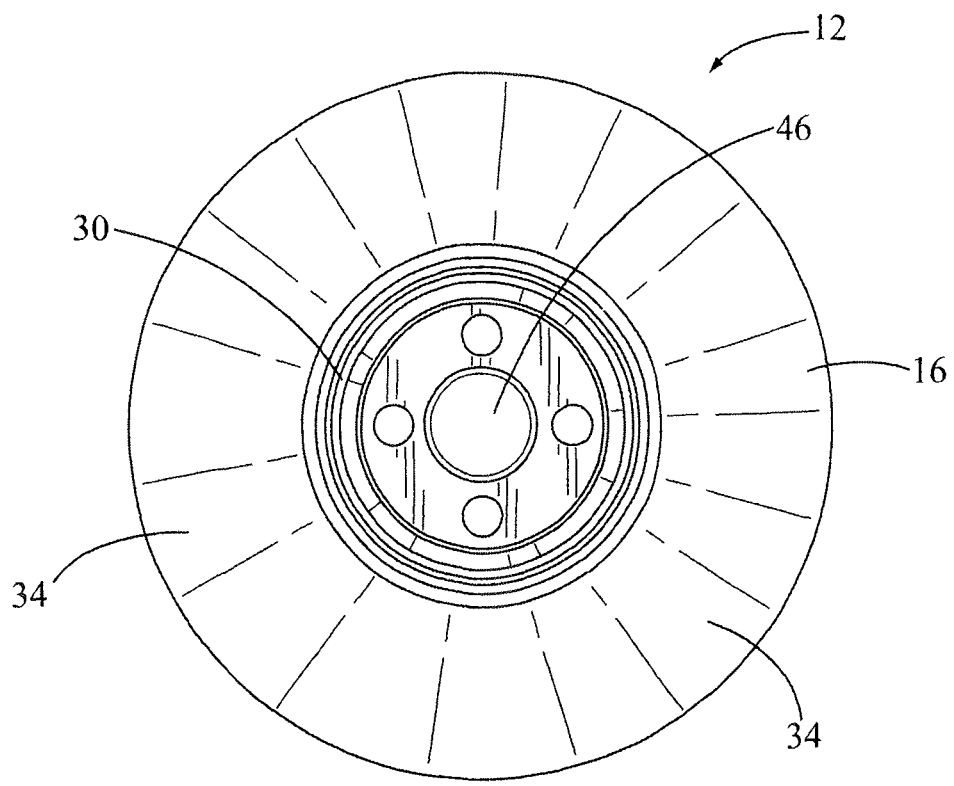
FIG. 7 is a top view of the lower chuck shown in FIG. 6. A center of the lower chuck includes a threaded center hole for mounting the lower chuck and impeller on the lower turret assembly, as shown in FIGS. 2 and 3.

In FIG. 7, a top view of the lower chuck 16 is illustrated, as shown in FIG. 6. A center of the lower chuck includes a threaded center hole for mounting the lower chuck and impeller on the lower turret assembly, as shown in FIGS. 2 and 3.

Figure 8:
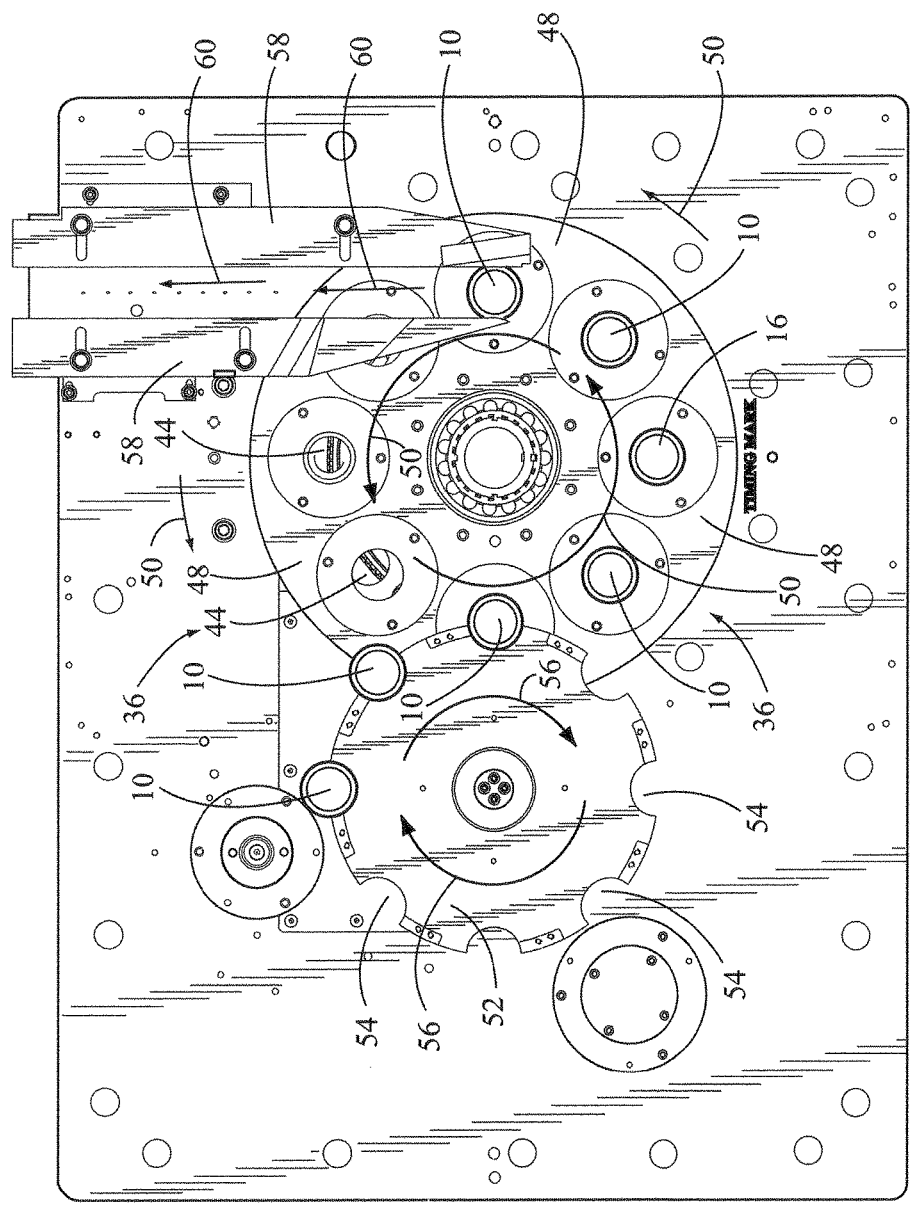
FIG. 8 is a top view of the sealant liner applicator with starwheel used for feeding can lids on to a turret support plate. In this drawing, the lower turret assembly includes 8 vacuum chucks for holding a plurality of can lids thereon.

In FIG. 8, a top view of the sealant liner applicator 36 is illustrated, with the upper turret assembly 38 removed to show a turret support plate 48. The turret support plate 48 is mounted above 8 lower turret assemblies 44, used with the subject vacuum chuck 12. Arrows 50 indicate a counter-clockwise movement of the sealant liner application 36 and turret support plate 48.

Mounted next to the sealant liner applicator 36 is a starwheel 52. The starwheel 52 includes a plurality of semi-circular can lid holders 54. The starwheel 52 is rotated in a clockwise direction, as indicated by arrows 56. The can lid holders 54 are used for feeding the can lids 10 onto the turret support plate 48. Also shown in this drawing is a pair of spaced apart can lid arms 58 used for receiving the can lids 10 there between and after the sealant has been applied thereto. Arrows 60 indicate the exiting of a can lid 10 from the sealant liner applicator 36.

While this drawing illustrates the sealant liner applicator 36 having 8 vacuum chucks mounted on lower turret assemblies 44, it should be kept in mind, the applicator 36 can include any number of turret assemblies used with the subject vacuum chuck 12.

Figure 9:
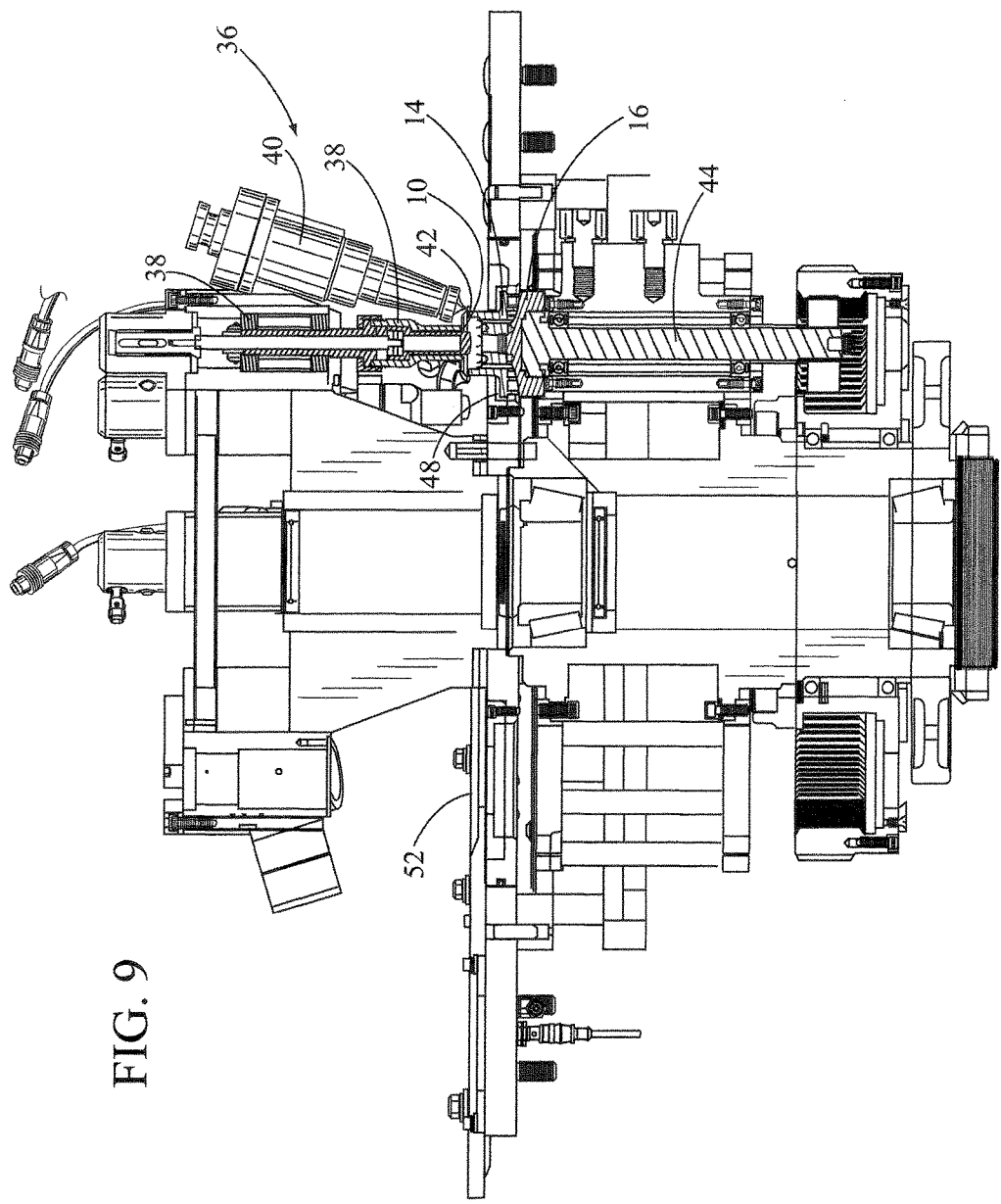
FIG. 9 is a side view of the sealant liner applicator shown in FIG. 8.

In FIG. 9, a side view of the sealant liner applicator 36 is illustrated, as shown in FIG. 8. In this drawing, the upper turret assembly 38, with sealant gun 40, is shown disposed above the turret support plate 48 and one of the lower turret assemblies 44. A lifting cam 62 on the applicator is used for raising the lower turret assembly 44, with the attached vacuum chuck 12, in an "up position", as shown in FIG. 4. As mentioned above, at this time the sealant is applied to the inside of the can lid 10 and prior to the lid exiting the sealant liner applicator 36.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A vacuum chuck adapted for mounting on a lower turret assembly, the lower turret assembly part a sealant liner applicator, the sealant liner applicator includes an upper turret assembly and a sealant gun, the sealant gun under computer control, the sealant gun used for applying a sealant around a periphery of an inside of a can or jar lid, the vacuum chuck comprising:
   an annular-shaped impeller;
   spiral vanes formed in the impeller, the spiral vanes creating vacuum air when the vacuum chuck is rotated at high speeds on the lower turret assembly;
   a plurality of vacuum ports disposed in the impeller for drawing the vacuum air through the spiral vanes; and
   an annular shaped lower chuck, the lower chuck attached to a bottom of the impeller, the lower chuck adapted for mounting on the lower turret assembly, the lower chuck includes an upwardly extending threaded post centered thereon, the threaded post is used for receipt in a base plate hole centered on the impeller.

2. The vacuum chuck as described in claim 1 wherein the lower chuck includes a concave top portion, the concave top portion received next to the spiral vanes in the impeller.

3. The vacuum chuck as described in claim 1 wherein the impeller includes a vane base plate disposed above the spiral vanes, the vane base plate including the vacuum ports therein.

4. A vacuum chuck adapted for mounting on a lower turret assembly, the lower turret assembly part a sealant liner applicator, the sealant liner applicator includes an upper turret assembly and a sealant gun, the sealant gun under computer control, the sealant gun used for applying a sealant around a periphery of an inside of a can or jar lid, the vacuum chuck comprising:

an annular-shaped impeller having a vane base plate;

spiral vanes formed in the impeller and disposed below the vane base plate, the spiral vanes creating vacuum air drawn through vacuum ports in the vane base plate, when the vacuum chuck is rotated in a range of 1000 to 4000 rpm, on the lower turret assembly; and an annular lower chuck, the lower chuck attached to a bottom of the impeller, the lower chuck adapted for mounting on the lower turret assembly, the lower chuck includes an upwardly extending threaded post, the threaded post is used for receipt in a base plate hole centered on the vane base plate.

5. The vacuum chuck as described in claim 4 wherein the lower chuck includes a concave top portion, the concave top portion received next to the spiral vanes in the impeller.

6. A vacuum chuck adapted for mounting on a lower turret assembly, the lower turret assembly part a sealant liner applicator, the sealant liner applicator includes an upper turret assembly and a sealant gun, the sealant gun under computer control, the sealant gun used for applying a sealant around a periphery of an inside of a can or jar lid, the vacuum chuck comprising:

an annular-shaped impeller having a vane base plate, the vane base plate having a plurality of vacuum ports therein, the vane base plate adapted for holding a can lid having a diameter in a range of 3 to 7 inches and greater;

spiral vanes formed in the impeller and disposed below the vane base plate, the spiral vanes creating vacuum air through the vacuum ports in the vane base plate, when the vacuum chuck is rotated in a range of 1000 to 4000 rpm, on the lower turret assembly; and an annular shaped lower chuck, the lower chuck attached to a bottom of the impeller and adapted for mounting on the lower turret assembly, the lower chuck includes an upwardly extending threaded post, the threaded post is used for receipt in a base plate hole centered on the impeller.

7. The vacuum chuck as described in claim 6 wherein the lower chuck includes a concave top portion, the concave top portion received next to the spiral vanes in the impeller.

\* \* \* \* \*